(12) United States Patent
Kremer et al.

(10) Patent No.: US 10,705,356 B2
(45) Date of Patent: Jul. 7, 2020

(54) METHOD FOR ADJUSTING THE INTENSITY OF A LIGHT BEAM IN AN OPTICAL ARRANGEMENT AND ASSOCIATED OPTICAL ARRANGEMENT

(71) Applicant: Leica Microsystem CMS GmbH, Wetzlar (DE)

(72) Inventors: Manuel Kremer, Leimen (DE); Vishnu Vardhan Krishnamachari, Seeheim-Jugenheim (DE); Arnold Giske, Sandhausen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 15/611,802

(22) Filed: Jun. 2, 2017

(65) Prior Publication Data
US 2017/0351073 A1 Dec. 7, 2017

(30) Foreign Application Priority Data
Jun. 3, 2016 (LU) .......................................... 93098

(51) Int. Cl.
*G02F 1/11* (2006.01)
*G02B 21/00* (2006.01)
*G02B 21/06* (2006.01)

(52) U.S. Cl.
CPC .......... *G02F 1/116* (2013.01); *G02B 21/0032* (2013.01); *G02B 21/06* (2013.01); *G02F 1/113* (2013.01)

(58) Field of Classification Search
CPC .................. G02F 1/113; G02F 1/11–1/125

USPC .................................................. 359/308, 309
See application file for complete search history.

(56) References Cited

U.S. PATENT DOCUMENTS

| 3,632,193 A * | 1/1972 | Kusters ................... G02F 1/116 359/308 |
| 3,783,185 A * | 1/1974 | Spaulding ................. G02F 1/11 347/232 |

(Continued)

FOREIGN PATENT DOCUMENTS

WO   WO 2015192967 A1   12/2015

OTHER PUBLICATIONS

Acousto-Optic Modulation. ISOMet. N.p., n.d. Web. Sep. 4, 2018.*

(Continued)

*Primary Examiner* — Zachary W Wilkes
(74) *Attorney, Agent, or Firm* — Leydig, Voit & Mayer, Ltd

(57) ABSTRACT

A method for adjusting an intensity of a light beam in an optical arrangement includes passing the light beam through an acousto-optical tunable filter (AOTF). The intensity of the light beam is adjusted as a function of frequency and/or amplitude of a sound wave with which the AOTF is operated. The amplitude of the sound wave at a specified sound wave frequency is selected such that the amplitude is larger than would be required to achieve a first maximum diffraction efficiency for a specified wavelength or for a specified wavelength spectrum of the light beam. The amplitude of the sound wave is also selected such that a value of an integral of a product of the transmission function of the AOTF and the wavelength spectrum of the light beam is larger than at a value of the amplitude to be selected to achieve the first maximum.

10 Claims, 7 Drawing Sheets

(56) References Cited

U.S. PATENT DOCUMENTS

| | | | | |
|---|---|---|---|---|
| 3,953,107 | A * | 4/1976 | Yano | G02F 1/116 359/308 |
| 4,052,121 | A * | 10/1977 | Chang | G02F 1/116 359/308 |
| 4,110,788 | A * | 8/1978 | Merry | G02F 1/33 348/196 |
| 4,217,036 | A * | 8/1980 | Chang | G02F 1/116 359/286 |
| 5,166,813 | A * | 11/1992 | Metz | G02B 5/32 250/458.1 |
| 5,357,097 | A | 10/1994 | Shiozawa et al. | |
| 6,867,899 | B2 * | 3/2005 | Knebel | G02B 21/0004 359/305 |
| 8,718,414 | B2 * | 5/2014 | Gugel | G02F 1/116 359/305 |
| 2003/0161361 | A1 | 8/2003 | Paldus et al. | |
| 2010/0053725 | A1 | 3/2010 | Seyfried | |
| 2013/0329270 | A1 | 12/2013 | Nielsen et al. | |

OTHER PUBLICATIONS

"Introduction to Acousto Optic Modulators and Deflectors." Optoscience. N.p., n.d. Web. Sep. 4, 2018.*

Fellers, Thomas, and Michael W. Davidson. "Acousto-Optic Tunable Filters (AOTFs)." Olympus Microscopy Resource Center | Spirostomum (Protozoa). N.p., Mar. 16, 2016. Web. Sep. 5, 2018.*

Chang, I. "Acousto-Optic Tunable Filters." Optical Engineering, vol. 20, No. 6, 1981, pp. 824-829.*

Gupta, Neelam, and Dennis R. Suhre. "Effects of Sidelobes on Acousto-Optic Tunable Filter Imaging." Optical Engineering, vol. 56, No. 7, 2017, p. 073106., doi:10.1117/1.oe.56.7.073106.*

Barócsi, Attila, et al. "Laboratory Tools and e-Learning Elements in Training of Acousto-Optics." Education and Training in Optics and Photonics: ETOP 2015, Oct. 8, 2015, doi:10.1117/12.2223088.*

Foundation, CK-12. "High School Chemistry/Light and the Atomic Spectra." High School Chemistry/Light and the Atomic Spectra—Wikibooks, Open Books for an Open World, Feb. 5, 2015, en.wikibooks.org/wiki/High_School_Chemistry/Light_and_the_Atomic_Spectra. (Year: 2015).*

Akis P. Goutzoulis, et al., „Design and Fabrication of Acousto-Optic Devices, Optical Science and Engineering, vol. 41, edition 1, Jan. 6, 1994, pp. 1-19.

Xu, Jieping et al. "Acousto-Optic Devices: Principles, Design, and Applications," Wiley-Interscience, pp. 72-89 and 587-590, Jun. 1992.

Chang, I.C., "Acousto-Optic Devices and Applications," Chapter 12, In: Bass, M., Ed., Handbook of Optics, vol. II., McGraw-Hill, United States, Dec. 1995.

* cited by examiner

METHOD FOR ADJUSTING THE INTENSITY OF A LIGHT BEAM IN AN OPTICAL ARRANGEMENT AND ASSOCIATED OPTICAL ARRANGEMENT

CROSS-REFERENCE TO PRIOR APPLICATION

Priority is claimed to Luxembourg Patent Application No. LU 93098, filed on Jun. 3, 2016, the entire disclosure of which is hereby incorporated by reference herein.

FIELD

The invention relates to a method for adjusting the intensity of a light beam in an optical arrangement, wherein the light beam is passed through an acousto-optical tunable filter, or AOTF, and its intensity is adjusted as a function of the frequency and/or amplitude of the sound wave with which the AOTF is operated.

The invention also relates to an optical arrangement, in particular for performing the method for adjusting the intensity of a light beam, preferably in a microscope, wherein the light beam is passed through an acousto-optical tunable filter, or AOTF, and its intensity is adjusted as a function of the frequency and/or amplitude of the sound wave with which the AOTF is operated.

BACKGROUND

Methods and optical arrangements with which the intensity of a light beam is adjusted are known in practice. A widespread option in this case involves the use of acousto-optical tunable filters—or AOTFs—which vary the intensity of an excitation light in laser scanning microscopes, for example.

In this process, acoustic sound waves—usually in the radiofrequency range—are applied to an optical crystal via a transducer, wherein the sound waves cause periodic modulation of the local refractive index of the crystal. This modulation acts like an optical grating or Bragg grating and is able to diffract light with a corresponding wavelength. The speed with which such an acoustic wave can be modulated, together with the low costs of acousto-optical tunable filters in comparison with other methods, such as methods based on electro-optical effects, mean that they have become the standard tool for light modulation in laser scanning microscopes, for example. Acousto-optical tunable filters for laser wavelengths in the visible range are very widely used, but there are also embodiments for infrared—multiphoton microscopy—or ultraviolet light.

SUMMARY

In an embodiment, the present invention provides a method for adjusting an intensity of a light beam in an optical arrangement. The light beam is passed through an acousto-optical tunable filter (AOTF). The intensity of the light beam is adjusted as a function of at least one of frequency or amplitude of a sound wave with which the AOTF is operated. The amplitude of the sound wave at a specified sound wave frequency is selected such that the amplitude is larger than would be required to achieve a first maximum diffraction efficiency for a specified wavelength or for a specified wavelength spectrum of the light beam. The amplitude of the sound wave is also selected such that a value of an integral of a product of the transmission function of the AOTF and the wavelength spectrum of the light beam is larger than at a value of the amplitude to be selected to achieve the first maximum.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
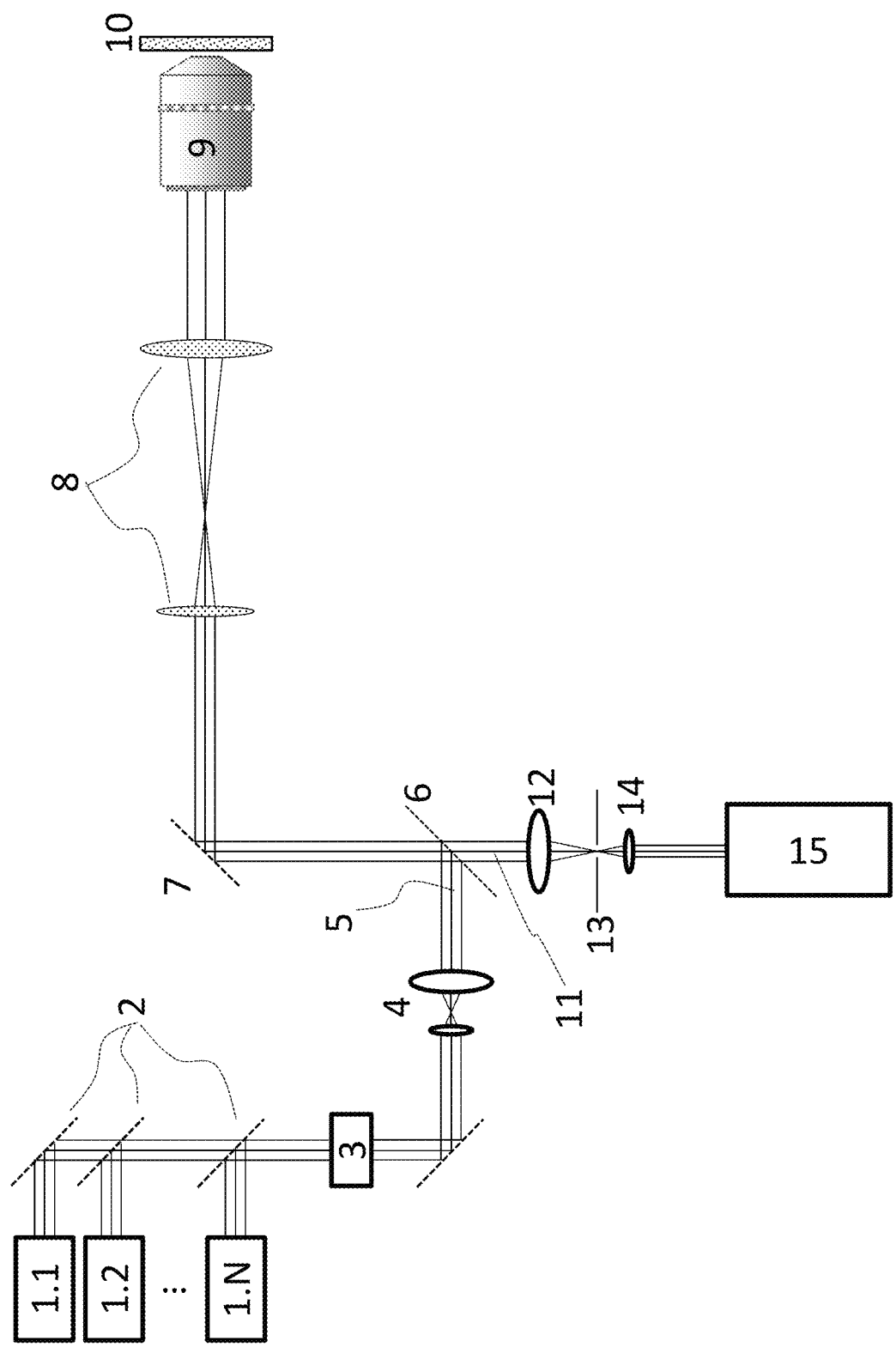
FIG. 1 is a schematic representation of an optical arrangement with an AOTF for adjusting the intensity of a light beam.

FIG. 1 shows one possible use of an AOTF in a laser scanning microscope or in a confocal laser scanning microscope. The light beams from a series of lasers numbered 1.1 to 1.N with different wavelengths are combined using wavelength-selective optical elements 2, for example edge filters, bandpass filters or notch filters, and reach an AOTF 3 located in the shared beam path. After passing through an optional lens 4 to adjust the beam diameter, the excitation beam 5 reaches a main beam splitter 6 of the microscope and a scanner unit 7. The light beam is then portrayed in an objective lens 9 with the aid of field lenses 8 from the scanner unit 7 and is finally focused on a specimen 10. The fluorescent light generated in the detection beam path 11 reaches a focusing lens 12, a confocal pinhole aperture 13 and a collimating lens 14 after passing through the main beam splitter 6 and is finally detected in the detection module 15.

Figure 2:
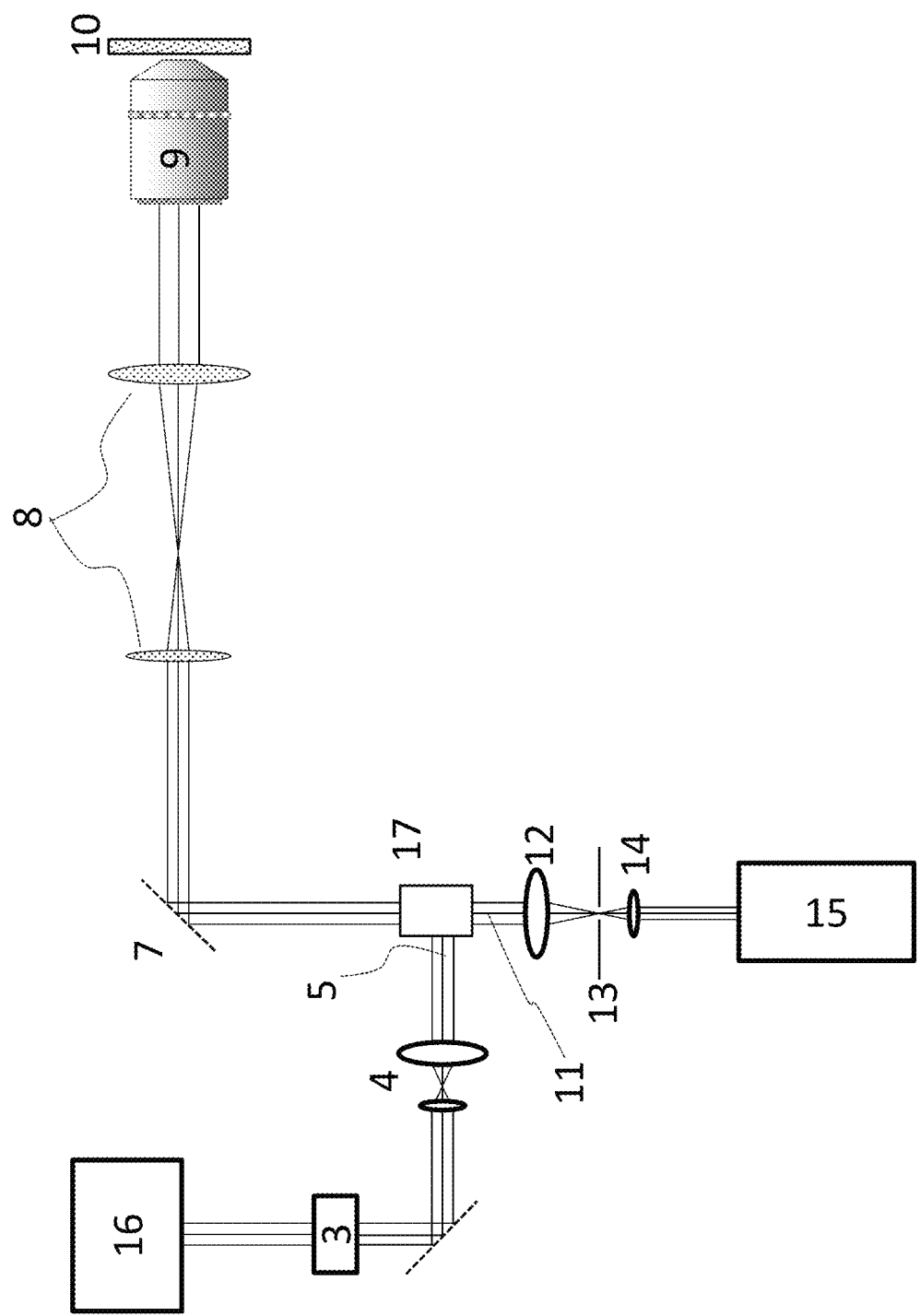
FIG. 2 is a schematic representation of a further optical arrangement with an AOTF for adjusting the intensity of a light beam.

FIG. 2 shows the same microscope, but the individual lasers 1.1 to 1.N from FIG. 1 are replaced by a supercontinuum laser 16—a so-called white light laser, WLL—and the main beam splitter 6 from FIG. 1 is replaced by an acousto-optical beam splitter 17, or AOBS.

Figure 3:
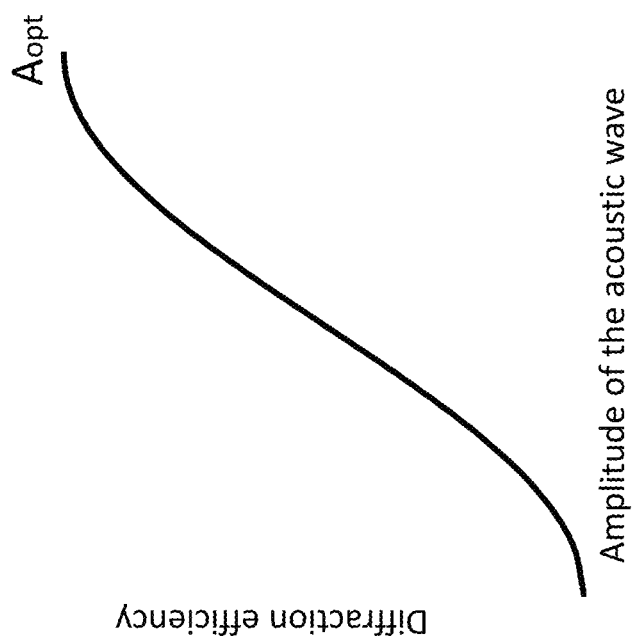
FIG. 3 shows the characteristic functions for operation of an AOTF in two diagrams.
Figure 3:
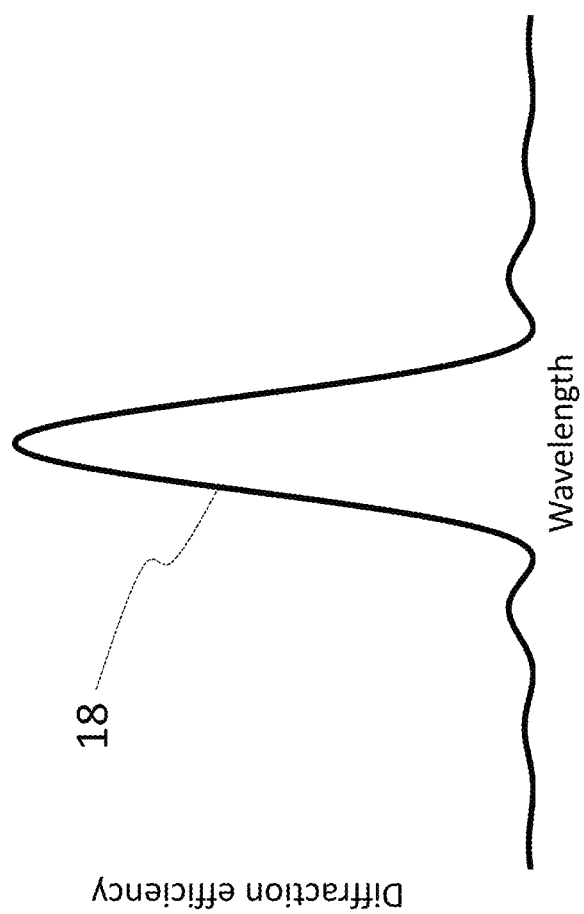

The characteristic functions for the operation of acousto-optical tunable filters, AOTFs, are outlined in FIG. 3. The left half of FIG. 3 shows the diffraction efficiency 18 for a specific frequency of the acoustic wave or sound wave as a function of the wavelength of the light which is to be adjusted with regard to its intensity, whereas the right half of FIG. 3 depicts the diffraction efficiency as a function of the amplitude of the acoustic wave or sound wave. For small amplitudes, the transmission function can be described as an approximate sinc squared function. For a specified wavelength, its width is dependent on the form and size of the transducer, but it typically ranges between 0.1 nm and 10 nm. The diffraction efficiency as a function of the amplitude of the acoustic wave or sound wave decreases again after reaching the optimum—at an amplitude $A_{opt}$—and would reach a minimum value at $2A_{opt}$. If AOTFs are used as pure modulators for light intensity, there is usually a control element in the microscope control software with which the acoustic amplitude can be adjusted between zero and $A_{opt}$, or in other words in the range illustrated in FIG. 3. The illustrated curve can optionally be mathematically linearized, with the result that doubling the adjusted value also causes the intensity of a light beam to double.

In various applications, the inventors have recognized that it is desirable to have higher illumination intensities at least for individual wavelengths of a white light laser than have been customary to date, for photobleaching experiments, for example.

Furthermore, the possibility of replacing gas lasers, which are traditionally used for fluorescence excitation, for example helium-neon or argon lasers, and diode-pumped solid-state lasers with more cost-effective diode lasers due to their relatively wide laser spectra—several nanometers—leads to high losses in terms of diffraction efficiency and thus to a relatively low available light output. A simple way of increasing the bandwidth of the corresponding acousto-optical elements would be useful in this respect for fluorescence microscopy, to ultimately achieve a higher light output.

According to an embodiment, the present invention therefore designs and develops a method and an optical arrangement of the above-mentioned type such as to achieve a particularly high light output in a simple manner.

According to an embodiment, the method is thus designed and developed such that the amplitude of the sound wave at the specified sound wave frequency is selected such that it is larger than would be required to achieve a first maximum diffraction efficiency for a specified wavelength or for a specified wavelength spectrum of the light beam, and in that the amplitude of the sound wave is also selected such that a value of an integral of a product of the transmission function of the AOTF and the wavelength spectrum of the light beam is larger than would be the case with the value of the amplitude to be selected to achieve the first maximum.

Furthermore, an optical arrangement according to an embodiment is designed and developed such that the amplitude of the sound wave at the specified sound wave frequency is selected such that it is larger than would be required to achieve a first maximum diffraction efficiency for a specified wavelength or for a specified wavelength spectrum of the light beam, and in that the amplitude of the sound wave is also selected such that a value of an integral of a product of the transmission function of the AOTF and the wavelength spectrum of the light beam is larger than would be the case with the value of the amplitude to be selected to achieve the first maximum.

In a manner according to an embodiment of the invention, it was first recognized that a conventional AOTF is not restricted to customary practice in terms of its mode of operation. In a further manner according to an embodiment of the invention, it was then recognized that a particularly high light output can be achieved in a surprisingly simple manner by operating an AOTF in a clever and alternative way. To this end, the amplitude of the sound wave at the specified sound wave frequency is selected in the first instance such that it is larger than the amplitude required to achieve a first maximum diffraction efficiency for a specified wavelength or for a specified wavelength spectrum of the light beam. The selected amplitude is therefore in excess of an amplitude required to achieve a first maximum diffraction efficiency. Thus usually leads to a reduction in diffraction efficiency in the first instance. As a further condition, the amplitude of the sound wave is also selected such that a value of an integral of a product of the transmission function of the AOTF and the wavelength spectrum of the light beam is larger than would be the case with the value of the amplitude to be selected to achieve the first maximum. In other words, the selected amplitude is not only larger than the amplitude required to achieve a first maximum diffraction efficiency for a specified wavelength or for a specified wavelength spectrum of the light beam. This could cause the diffraction efficiency to merely lie below the first maximum. However, in a manner according to an embodiment of the invention, it was recognized that further increasing the amplitude causes the diffraction efficiency to rise even higher after falling initially, rising to a value in excess of the diffraction efficiency for the first maximum. An associated possible widening of the transmission function peak is then very important for spectral broadband light beams as the overall light intensity that can be achieved depends on the integral of the product of the transmission function of the AOTF and the wavelength spectrum of the light beam. If this integral is larger than at the amplitude required to achieve the first maximum diffraction efficiency, this results in an overall higher light intensity. It should be borne in mind that, in many applications, the resulting larger spectral width of the light beam, usually just a few nanometers, ultimately serves no practical purpose due to the typically broadband absorption spectra of the dyes used, especially if the intention is merely to increase the photobleaching effect.

As a result, the method according to an embodiment of the invention and the optical arrangement according to an embodiment of the invention describe a method and an optical arrangement of the type mentioned at the outset with which a particularly high light output can be achieved by simple means.

With regard to increasing the light output in a particularly effective manner, the light source or light sources generating the light beam can be selected or adjusted such that the wavelength spectrum of the generated light beam is wider than or as wide as the width of the wavelength-dependent transmission function of the AOTF. In other words, the value of the integral of the product of the transmission function of the AOTF and the wavelength spectrum of the light beam can then be increased particularly safely by increasing the amplitude of the sound wave, if the wavelength spectrum of the light beam is wider than the width of the transmission function of the AOTF.

In a specific embodiment of the invention, the selected amplitude is more than twice as large as the amplitude to be selected to achieve the first maximum. In this case, the diffraction efficiency for a specified wavelength or for a specified wavelength spectrum of the light beam increases beyond the value of the first maximum—when the amplitude is increased still further.

With regard to particularly safe operation of the AOTF, the amplitude can be selected to be less than or equal to three times the amplitude to be selected to achieve the first maximum. As a general rule, a higher amplitude can also be selected, but the increase in amplitude is fundamentally limited by the mechanical stability of the AOTF and/or any undesirable non-linearities arising in the crystal, the transducer or in the electronic driver for the AOTF. If the selected amplitude is too high, the AOTF can be damaged.

In a further specific embodiment, the light beam may have a pre-definable wavelength bandwidth. In this case, it should be adjusted to the respective application.

To ensure a particularly safe and simple method, the light beam can be provided by a white light laser or by one or a plurality of diode lasers. Again in this case, it should be adjusted to the respective application and the most favorable version for the individual application can be selected.

Especially when using a plurality of individual lasers to generate the light beam, said light beam can be provided as a unified light beam.

In a particularly advantageous embodiment of the optical arrangement and if the optical arrangement is integrated in a microscope, a notch filter can be arranged in a detection beam path to block an excitation light. Such an embodiment is useful particularly when using a white light laser as the light source generating the light beam, provided that the operation is restricted to a number of selected wavelengths of the white light laser for which increased light intensity is required.

In a further advantageous embodiment of the optical arrangement and if said optical arrangement is integrated in a microscope and if an acousto-optical beam splitter, or AOBS, is designed as part of the optical arrangement in a two-crystal arrangement, a second crystal of the AOBS can be operated with an amplitude selected to be sufficiently large to diffract excitation light reflected by a specimen from a detection beam path in the same way as the AOTF. A reflected excitation light is thus safely diffracted from the detection beam path.

To summarize, it is possible to state that, in the method according to an embodiment of the invention and the optical arrangement according to an embodiment of the invention, non-linearities in the behavior of an AOTF can be utilized with regard to the functional relationship between the selected frequency and/or amplitude of the sound wave acting on the AOTF, the wavelength of the light beam to be influenced and a resulting diffraction efficiency in order to increase the intensity and width of the light beam resulting after passing through the AOTF.

In connection with an embodiment of the present invention, it was recognized that the usual mode of operation of an AOTF as outlined in FIG. 3 can be optimized with a view to achieving a higher light intensity. The present invention therefore describes a new mode of operation—enhanced power mode—which allows illumination intensities to be increased without requiring any structural changes to the AOTF or to the structures and beam paths illustrated in FIGS. 1 and 2.

Figure 4:
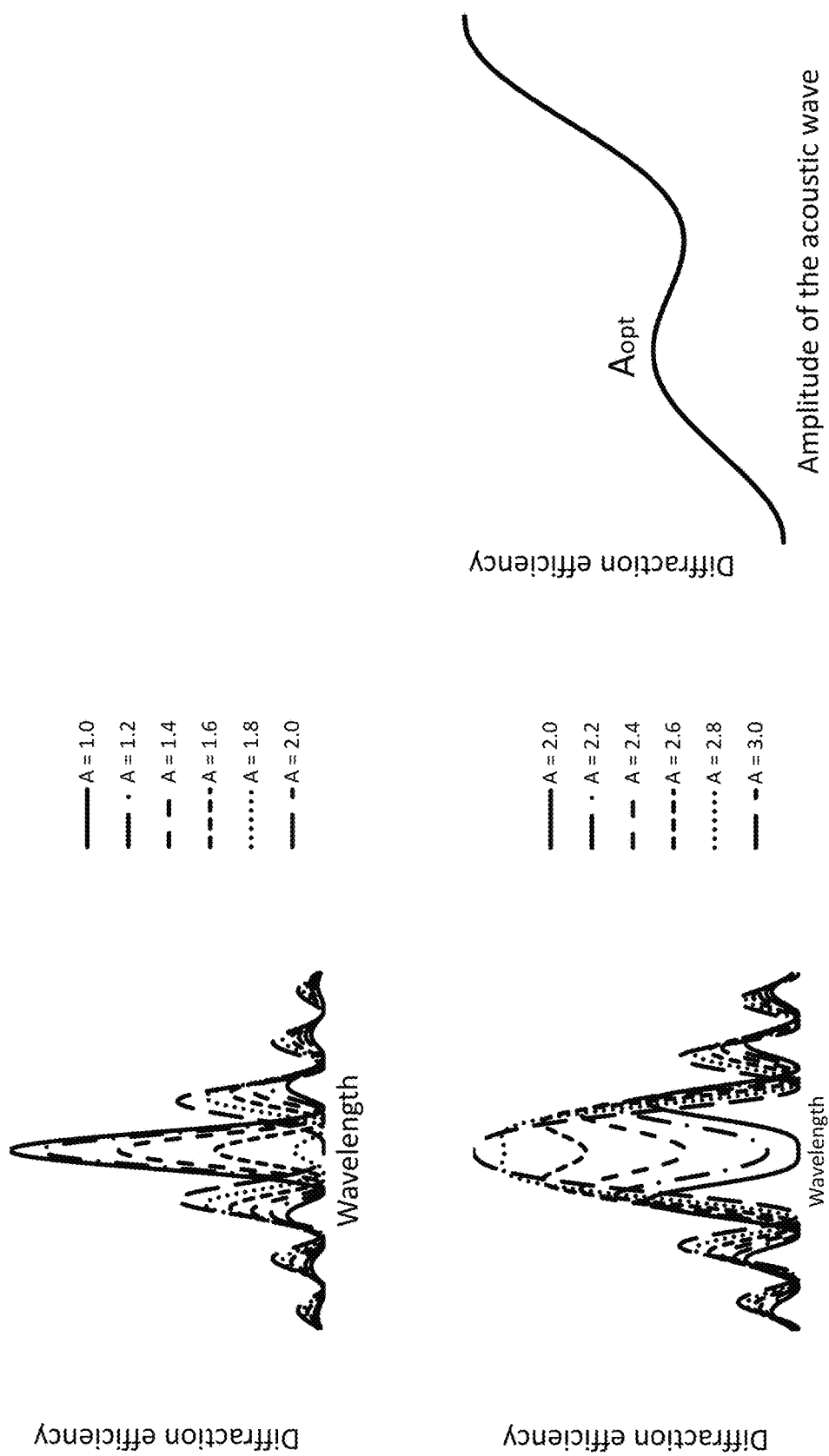
FIG. 4 shows the diffraction efficiency as a function of wavelength for different amplitudes and light intensity as a function of the amplitude of a sound wave in three diagrams.

If an AOTF is used to vary the intensity of spectral narrow-band lasers—typically helium-neon, argon or diode-pumped solid-state lasers in fluorescence microscopy—the precise shape of the wavelength-dependent transmission function of the AOTF—see FIG. 3—is practically irrelevant as it solely comes down to the maximum diffraction efficiency. For this reason, the amplitude of the acoustic wave or sound wave is usually only varied between zero and $A_{opt}$. However, if we consider the transmission function of the AOTF for amplitudes in excess of $A_{opt}$, it is clear that the sidebands of the transmission function increase in the first instance and that the mean maximum is reduced. With an amplitude of $2A_{opt}$, this maximum falls to 0 and then rises again for larger amplitudes. This behavior is illustrated on the left-hand side of FIG. 4. For the sake of clarity, the curves for amplitudes A between $A_{opt}$ and $3A_{opt}$ are shown in two diagrams. In addition to the behavior of the mean maximum as mentioned above, a broadening of this maximum or peak as the amplitude becomes larger can also be observed. In the case of spectral broadband lasers, in addition to the value of the maximum, the integral—or specifically the integral of the product of the transmission function and the laser spectrum or light beam spectrum—under the curves illustrated on the left-hand side of FIG. 4 is also important for the overall diffraction efficiency. The resulting light intensity is illustrated on the right-hand side of FIG. 4 (also labeled as "diffraction efficiency") as a function of amplitude in the event that the laser spectrum is significantly wider than the transmission function of the AOTF. In this case, the first maximum arises at an amplitude of $A_{opt}$ and the second maximum at $3A_{opt}$. The light intensity in the first diffraction arrangement of the AOTF can be increased in this manner by more than a factor of two. With the wide excitation spectra of the dyes used in fluorescence microscopy, the resulting increased spectral width of the excitation light—several nanometers—is practically irrelevant.

Two major conditions must be fulfilled in this connection to ensure practical use of this new operating mode according to an embodiment of the invention in conjunction with a laser scanning microscope:

1. The coupling efficiency of the main beam splitter 6 according to FIG. 1 or an AOBS 17 according to FIG. 2 must be sufficiently high.
2. Suppression of reflected excitation light at optical elements and/or by the specimen 10 to be examined should not be adversely affected.

Re 1: When using notch or edge filters, the slightly increased spectral width of the excitation light for typical embodiments is not a problem as the bandwidth of such filters is still significantly larger than the bandwidth of the laser light diffracted by the AOTF. If an AOBS is used as a beam splitter, said AOBS is designed to ensure that its transmission function has a larger bandwidth—typically larger by a factor of two—than the upstream AOTF. Thanks to the wider excitation spectrum, the diffraction efficiency of the AOBS is reduced, but also simple considerations similar to the considerations outlined above indicate that, despite the reduced efficiency, 60 to 70% more excitation light still reaches the specimen than in the normal operating mode with a maximum amplitude of $A_{opt}$.

Figure 5:
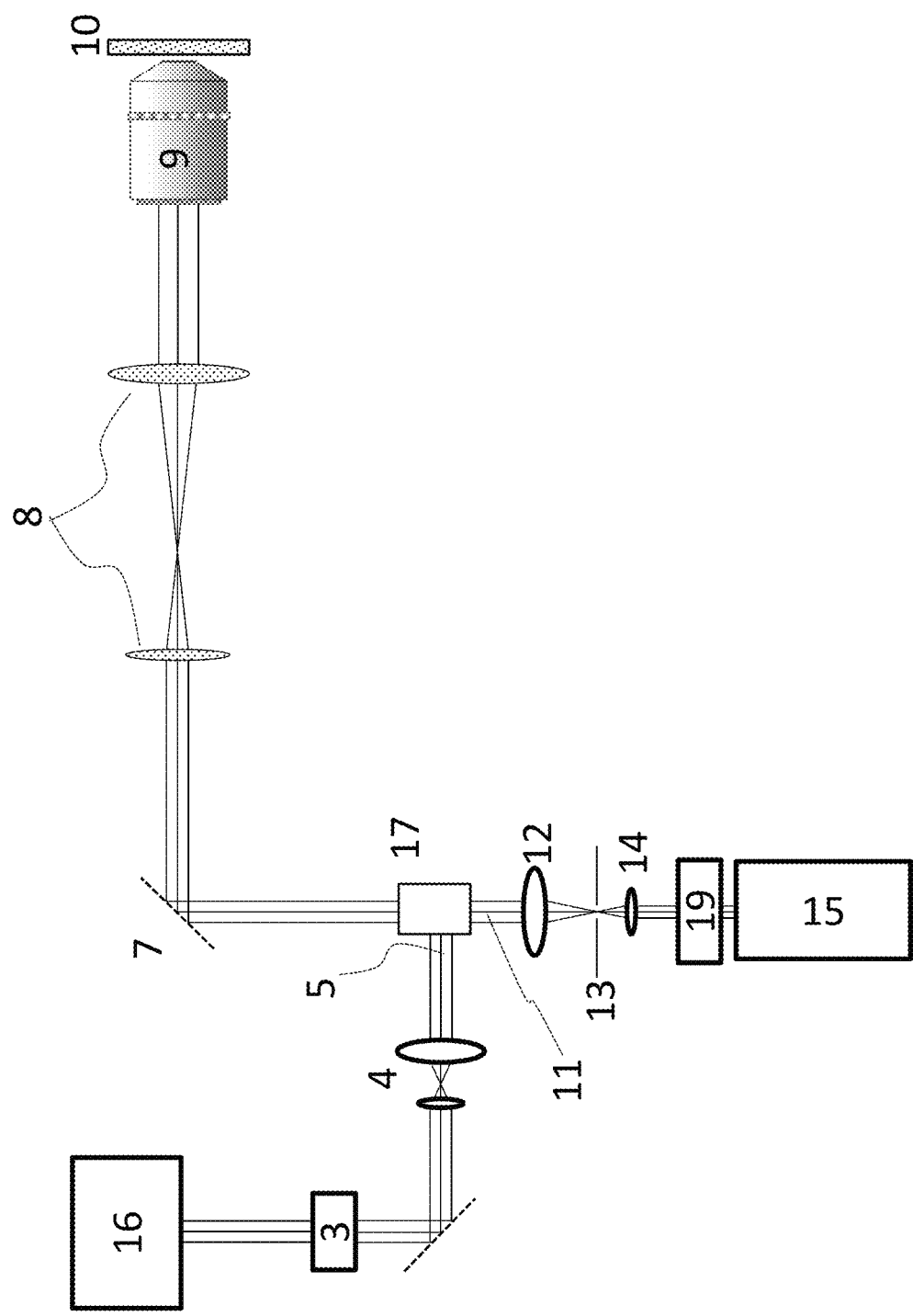
FIG. 5 is a schematic representation of an optical arrangement in the form of a microscope with an additional notch filter according to an embodiment of the invention.

Re 2: Suppression of the excitation light is not a problem with filter-based configurations for the same reasons as in Point 1. In the case of an AOBS, reflection suppression is reduced depending on the selected AOTF and AOBS designs. As suppression of the excitation light is also very dependent on the detectors used and in particular on their arrangement, it is not possible to suggest a general criterion for the point at which suppression is acceptable. Instead, decisions must be taken on a case-by-case basis to assess whether the reduced reflection suppression is acceptable. At this point there are two possible options for improving suppression still further based on embodiments of the invention:

In the first option, a notch filter or a plurality of notch filters can be arranged in the detection beam path. When using a white light laser, if the choice is restricted to a number of selected wavelengths for which enhanced power mode is approved, an additional notch filter can be incorporated in the detection beam path to block the excitation light. FIG. 5 shows such a possible embodiment in which the precise position of the notch filter 19 in the beam path 11 is irrelevant.

Figure 6:
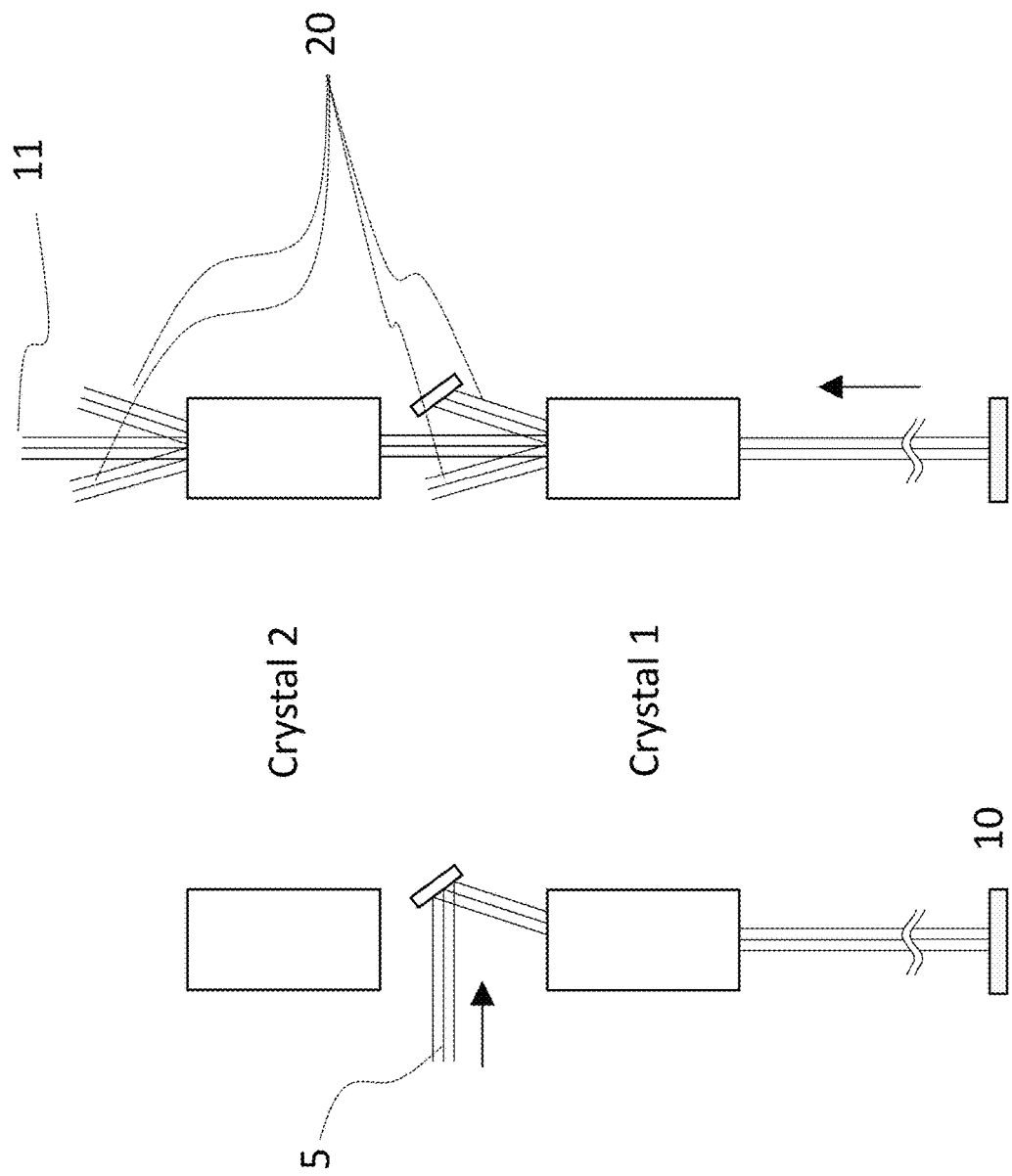
FIG. 6 shows a portion of an optical arrangement in a specimen region according to a further embodiment of the invention and FIG. 7 is a schematic representation of two possible operating modes with a corresponding control system according to an embodiment of the invention.

If the AOBS is designed according to a second option and a further embodiment in a two-crystal arrangement, the crystal 2 can also be operated in enhanced power mode like the AOTF, i.e. with an increased amplitude. Once again, this ensures greater suppression of the excitation light. FIG. 6 illustrates such an arrangement as part of a first embodiment. The excitation light 5 is deflected to the specimen by the first AOBS crystal in normal operating mode. The reflected excitation light 20 is diffracted from the detection beam path 11 by the crystal 1—in the normal operating mode—and crystal 2—in enhanced power mode.

The various diffraction directions of the reflected excitation light 20 result from varying polarization of the light.

If enhanced power mode according to the method in the invention is only used for photobleaching experiments, reflection suppression only plays a subordinate role, as detection usually does not take place during bleaching and the arrangement can be switched back to normal operating mode for measurements after bleaching.

Figure 7:
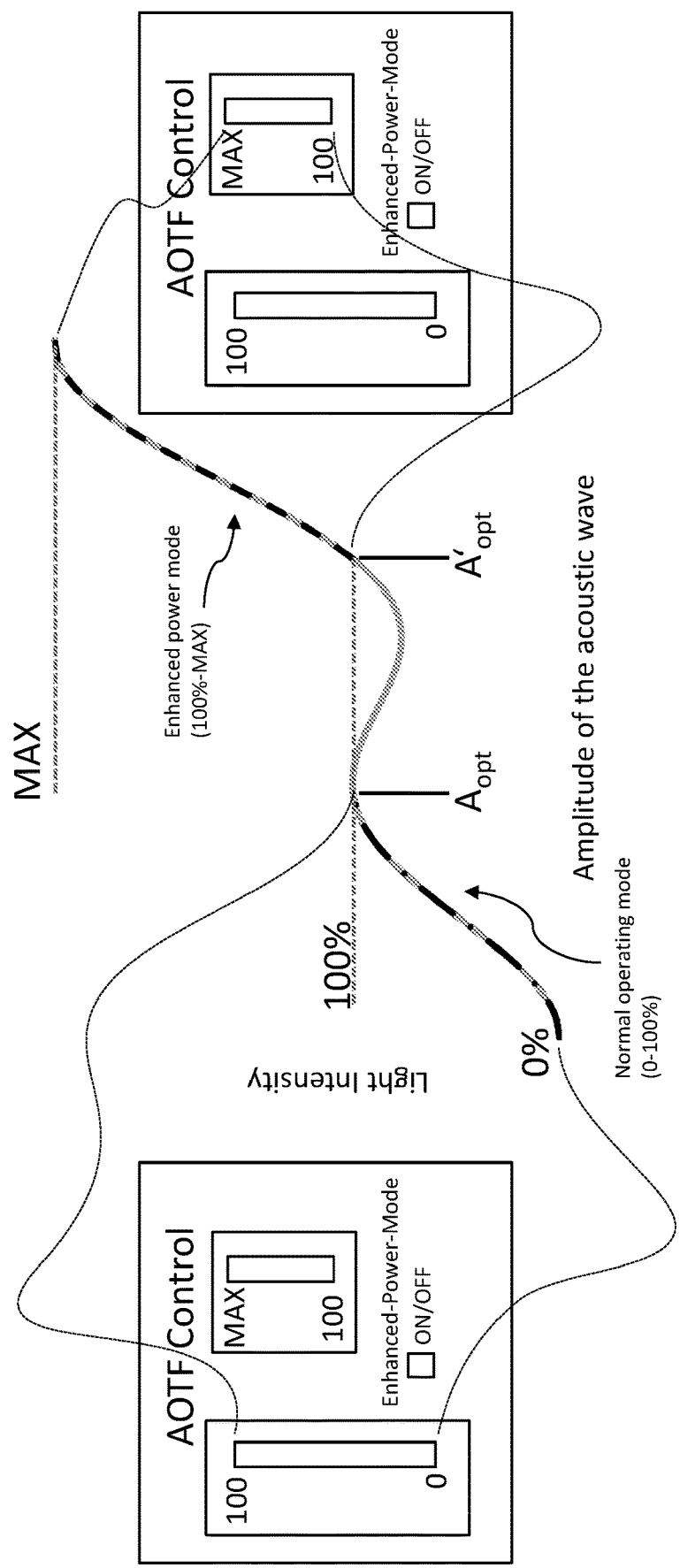

FIG. 7 illustrates the two possible operating modes and a possible advantageous implementation of the control system. In normal operating mode, the acoustic amplitude or the amplitude of the sound wave is varied between zero and $A_{opt}$ by using a control element. To this end, the light intensity is varied between 0 and 100%. When enhanced power mode is switched on, the amplitude can be adjusted between $A'_{opt}$ and the maximum value by means of a second control element and thus the light intensity can be varied between 100% and the maximum achievable light percentage (MAX). Both control elements can be linearized—by means of different mathematical functions as applicable.

To avoid repetition, please refer to the general part of the description and to the attached claims for further advantageous embodiments of the method according to the invention and the optical arrangement according to the invention.

Finally, it is expressly noted that the above-mentioned embodiments are merely intended to explain the claimed inventive concept, but this concept is by no means restricted to the embodiments While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1.1 to 1.N laser
2 optical element
3 AOTF
4 lens
5 excitation beam
6 main beam splitter
7 scanner unit
8 field lens
9 objective lens
10 specimen
11 detection beam path
12 focusing lens
13 pinhole aperture
14 collimating lens
15 detection module
16 laser
17 AOBS
18 diffraction efficiency
19 notch filter
20 excitation light

What is claimed is:

1. A method for adjusting an intensity of a light beam in an optical arrangement, the method comprising:
passing the light beam through an acousto-optical tunable filter (AOTF); and
adjusting the intensity of the light beam as a function of at least one of frequency or amplitude of a sound wave with which the AOTF is operated,
wherein the amplitude of the sound wave at a specified sound wave frequency is selected such that the amplitude is greater than would be required to achieve a first peak intensity for a specified wavelength or for a specified wavelength spectrum of the light beam,
wherein the amplitude of the sound wave is also selected such that a value of an integral of a product of a transmission function of the AOTF and the wavelength spectrum of the light beam is greater than a value of an integral of a product of the transmission function of the AOTF and the wavelength spectrum of the light beam at the amplitude to be selected to achieve the first peak intensity, and
wherein a light source or light sources generating the light beam is or are selected or adjusted such that the wavelength spectrum of the light beam is continuous and wider than or as wide as the width of the transmission function of the AOTF.

2. The method according to claim 1, wherein the selected amplitude is more than twice as large as the amplitude to be selected to achieve the first maximum.

3. The method according to claim 1, wherein the selected amplitude is less than or equal to three times the amplitude to be selected to achieve the first maximum.

4. The method according to claim 1, wherein the light beam has a pre-definable wavelength bandwidth.

5. The method according to claim 1, wherein the light beam is provided using a white light laser or a diode laser.

6. The method according to claim 1, wherein the light beam is provided as a unified light beam by a plurality of individual lasers.

7. The method according to claim 1, wherein the intensity of the light beam is adjusted as a function of the amplitude of the sound wave with which the AOTF is operated, and is not adjusted as a function of the frequency of the sound wave with which the AOTF is operated.

8. An optical arrangement, comprising an acousto-optical tunable filter (AOTF) disposed so as to have a light beam passed therethrough, the optical arrangement being configured to adjust an intensity of the light beam as a function of at least one of frequency or amplitude of a sound wave with which the AOTF is operated, wherein the amplitude of the sound wave at a specified sound wave frequency is selected such that the amplitude is greater than would be required to achieve a first peak intensity for a specified wavelength or for a specified wavelength spectrum of the light beam, wherein the amplitude of the sound wave is also selected such that a value of an integral of a product of a transmission function of the AOTF and the wavelength spectrum of the light beam is greater than a value of an integral of a product of the transmission function of the AOTF and the wavelength spectrum of the light beam at the amplitude to be selected to achieve the first peak intensity, and wherein a light source or light sources generating the light beam is or are selected or adjusted such that the wavelength spectrum of the generated light beam is continuous and wider than or as wide as the width of the transmission function of the AOTF.

9. The optical arrangement according to claim 8, wherein the optical arrangement is integrated in a microscope, and wherein a notch filter is arranged in a detection beam path so as to block an excitation light.

10. The optical arrangement according to claim 8, wherein the optical arrangement is integrated in a microscope, wherein an acousto-optical beam splitter (AOBS) is part of the optical arrangement in a two-crystal arrangement, a second crystal of the AOBS being operable with an amplitude selected to be sufficiently large so as to diffract excitation light reflected by a specimen from a detection beam path in the same way as the AOTF.

* * * * *